(No Model.)
C. H. STEPHENSON.
BICYCLE PARCEL CARRIER.
No. 586,294. Patented July 13, 1897.
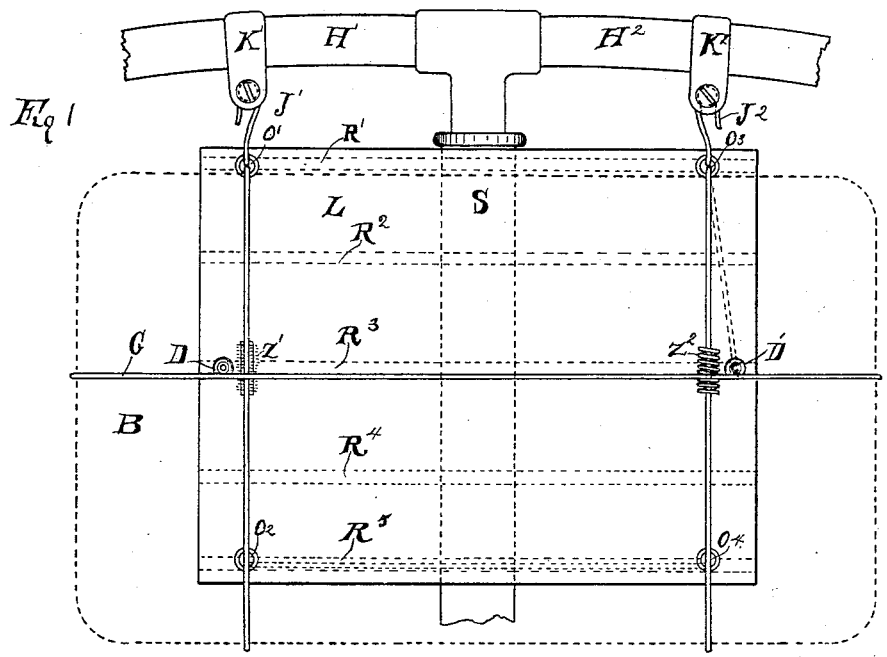
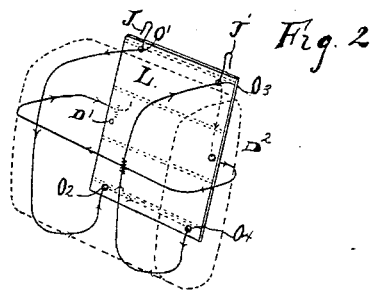
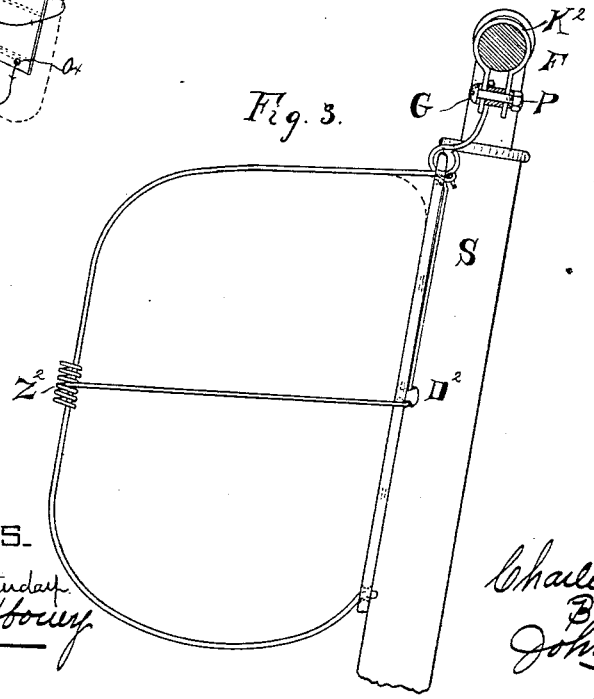
WITNESSES.
Harry C. Westendarp
John W. Gibboney
INVENTOR.
Charles H. Stephenson
By his attorney
John W. Gibboney

UNITED STATES PATENT OFFICE.

CHARLES H. STEPHENSON, OF LYNN, MASSACHUSETTS.

BICYCLE PARCEL-CARRIER.

SPECIFICATION forming part of Letters Patent No. 586,294, dated July 13, 1897.

Application filed May 20, 1897. Serial No. 637,399. (No model.)

*To all whom it may concern:*

Be it known that I, CHARLES H. STEPHENSON, a citizen of the United States, residing at Lynn, in the county of Essex and Commonwealth of Massachusetts, have invented certain new and useful Improvements in Parcel-Carriers for Bicycles, which are described as follows:

My invention is an improved parcel-carrier especially adapted for attachment to the ordinary bicycle of to-day.

The object of my invention is to provide a parcel-carrier which shall be very light, though strong, and able to support a considerable weight; which shall be able to be readily attached to or detached from the bicycle; which shall occupy but a small space when not in use, so that it may be readily carried in a pocket; which shall hold its contents securely against displacement or loss, and which can be cheaply manufactured and sold at a moderate price.

The parcel-carrier of my invention may be made to weigh but a few ounces and can be folded up into such a small space as to be easily carried in a pocket or in the ordinary bicycle tool-bag. It is flexible, so as to adapt itself to the shape of the article to be carried, and can safely support a weight of twenty-five pounds or more, and the means of securing the article to be carried therein and the mode of attachment to the bicycle are simple and effectual in preventing displacement of the article or the loss of the carrier during riding.

My invention will be understood by reference to the accompanying drawings, in which—

Figure 1 is a front view of my improved parcel-carrier shown in its position upon the bicycle. Fig. 2 is explanatory of the parcel-fastenings and shows how the article or articles to be carried are secured in the carrier. Fig. 3 is a side view of the carrier in position on the bicycle, showing how it is supported thereon; and Fig. 4 shows my improved carrier in its folded position.

In Figs. 1 and 3, S is part of the steering-head of a bicycle, and H' H² are parts of the steering-handles extending at right angles to the head S, only so much of the bicycle parts being shown as is necessary to understand my invention.

The main portion of my improved parcel-carrier consists of several pieces or layers of leather or strong canvas or similar cloth, (marked L,) which pieces may be called the "apron," two pieces of leather or cloth being usually employed, the one superimposed upon the other, and they are fastened together firmly, as by stitching, riveting, or eyeleting. Between the layers of the apron L are placed stiffening-pieces of metal in the form of round bars or flat strips of steel, which, if desired, may also be made of rattan or similar material, and these are marked R' R² R³, &c., in the drawings. These rods or strips of steel are of the same or nearly the same length as the leather or cloth apron, and a convenient and preferred mode of securing them in place is to make two parallel lines of stitches across the apron L at those places where the stiffening-pieces are desired, the lines of stitches being so spaced from each other as will allow the stiffening-strips R', &c., to be forced into the small space between the layers when considerable pressure is exerted, so as to make a tight fit. These stiffening-pieces of steel, rattan, or similar material are placed, preferably, near the upper and lower edges of the apron, as at R' R⁵, and one or more may also be placed intermediate R' and R⁵, as at R² R³, &c. I provide also at the corners of the apron L holes O' O² O³ O⁴, which may be eyelet-holes, and at the middle and on the back of the apron I likewise provide metal hooks or eyelets D' D², which may be similar to those used upon the upper part of laced shoes. Two of the eyelet-holes, as O' O³, permanently engage with wire hooks J' J² through suitable loops, the open ends of the hooks extending outwardly for engagement with suitable coöperating devices upon the bicycle handle-bars H' H², to which are permanently attached metallic clips K' K², which clips are slipped over the handle-bars and have their free ends brought together by a screw and nut G, as seen in Fig. 3, so as to clamp the handle-bar firmly, and a metal ferrule F, placed over the screw, acts as a spacer for the free ends of the clips K' K² and protects the threads of the screw. The hooks $J'$ $J^2$ are adapted to engage over the ferrule F, but the hooks are so extended or lengthened as compels their insertion sidewise—that is, they must be brought to a position nearly at right angles to their position shown in the drawings before they are able to be passed over the screw G—and the distance between the handle-bars $H'$ $H^2$ and the ferrule F is made such relatively to the length of the hooks $J'$ $J^2$ that no movement vertically can free these parts from engagement. A cord C completes the parts comprised in my carrier. This cord is secured at one end, as by a knot, in one of the eyeleted holes, as $O'$, Fig. 2. It is then passed down through hole $O^2$, across the back of the carrier, and up through hole $O^4$, and then down through hole $O^3$, the remainder of the cord being left free. This is the position of the cord when the carrier is in its folded condition.

In using my improved parcel-carrier the proceeding is as follows: The apron L is spread out flat and the coat, cloak, jacket, or other article is placed thereon and underneath the cords extending between the holes $O'$ $O^2$ and $O^3$ $O^4$. The cord C is then drawn upon, so as to lash the parcel to the apron L, and when taut the cord C is looped around the metal hook $D^2$ and is then led up over the end of the bundle to the other metal hook $D'$. It may now be secured by half-hitches, or, depending on the size of the bundle, may be led back again to the hook $D^2$, &c., to take up slack when the end is secured in any common way, as by half-hitches. I prefer, however, to provide a spring-clip, one or more, as $Z'$ $Z^2$. The clip $Z'$ may be placed upon the back of the carrier-body, as indicated in the dotted lines, Fig. 1, or it may be simply strung upon the cord C between the holes $O'$ $O^2$ or $O^3$ $O^4$ and the end of the cord pressed between the spirals of the spring after the slack has been taken up.

Fig. 4 simply shows my carrier detached from the bicycle and folded, and is presented merely to indicate its compactness in the folded condition, it occupying so small a space as to be easily kept in a pocket.

Owing to the small weight of my improved carrier and its form it is not necessary to leave it on the bicycle in removing the parcel, but by bending the hooks $J'$ $J^2$, so as to slip them out from over the ferrules F laterally, the carrier with its contents are taken off together. This is of great convenience in saving time when the bicycle-rider desires to leave his machine for a time under conditions when he feels that it would be unsafe to leave the parcel-carrier with its contents on the machine. The apron L protects the bundle from chafing against the bicycle and from soiling when laid down upon the ground, &c.

The carrier of my invention being supported in suspension enables a greater weight to be carried than when platforms or other rigid supports extending outwardly are used, and being supported from two sides and resting against the frame of the machine violent oscillations are avoided. The securing-cord is attached in such a manner as enables the bundle to be made up and lashed in place in a very short time, and holds the contents of the carrier securely against displacement both outwardly and laterally, and lateral displacement of the contents of the carrier is a fault existing in most of the carriers with which I am familiar. The hook suspension from the clips on the handle-bars makes it impossible for the carrier to become loosened without actual breakage, while at the same time it may be quickly removed with its contents by simply disengaging the hooks in the described manner and in a convenient form for carrying without any material addition to the weight.

Having now described my invention, what I claim, and desire to secure by Letters Patent, is—

1. A parcel-carrier for bicycles comprising rectangular pieces of flexible material, such as leather or cloth, having stiffening rods or strips arranged lengthwise thereon, having holes at the corners thereof for the passage of a securing-cord, having metal engaging hooks on the back thereof, and having supporting-hooks permanently engaged in one set of the holes; in combination with suitable metallic clips adapted to be attached to the handle-bars of a bicycle, said carrier-hooks and said clips adapted to mutually engage, and a lacing-cord, substantially as described.

2. The combination in a bicycle parcel-carrier, of a main portion or apron consisting of superimposed layers of a flexible material, such as leather or canvas, having metallic stiffening rods or strips between the layers thereof, having eyelet-holes at the corners, lacing-hooks on the back thereof, and suitable suspension-hooks attached thereto; and suitable metallic clips adapted for engagement with the handle-bars of a bicycle, substantially as and for the purpose described.

3. A folding parcel-carrier for bicycles, consisting of superimposed layers of flexible material forming an apron, having metallic rods or strips between the layers so as to stiffen the same in one direction while permitting flexibility in a direction at right angles thereto, cord-engaging devices thereon, suspension-hooks therefor, a cord; in combination with engaging devices adapted to be permanently attached to the handle-bars of a bicycle, said carrier, with its contents, adapted to be disengaged from the bicycle by bending said suspension-hooks at an angle from their normal position, as described.

4. In a bicycle parcel-carrier the combination of, an apron flexible in one direction and stiffened in a direction at right angles thereto having lacing and looping cord engaging devices and having suspension-hooks attached thereto, a cord, and supporting-clips adapted to be attached to the handle-bars of a bicycle, as set forth.

5. In a bicycle parcel-carrier the combination of an apron or main portion L having lacing-openings $O'$ $O^2$ &c., looping clips or hooks $D'$ $D^2$, suspension-hooks $J'$ $J^2$, a cord C, and clips $K'$ $K^2$ adapted to engage the handle-bars of a bicycle and said suspension-hooks $J'$ $J^2$, as herein described.

Signed at Lynn, Massachusetts, this 15th day of May, 1897.

CHARLES H. STEPHENSON.

Witnesses:
 JOHN W. GIBBONEY,
 HENRY O. WESTENDARP.